United States Patent [19]

Saravis

[11] 4,196,085
[45] Apr. 1, 1980

[54] DIALYSIS SOLUTION HANDLING DEVICE

[75] Inventor: Calvin A. Saravis, Boston, Mass.

[73] Assignee: The United States of America as represented by the Department of Health, Education and Welfare, Washington, D.C.

[21] Appl. No.: 694,396

[22] Filed: Jun. 9, 1976

[51] Int. Cl.² ............................................. B01D 13/00
[52] U.S. Cl. ............................. 210/232; 210/321 A; 210/DIG. 24
[58] Field of Search ................ 23/230 B, 259; 210/22, 210/232, 321 R, 321 A

[56] References Cited

U.S. PATENT DOCUMENTS

| | | | |
|---|---|---|---|
| 2,660,167 | 11/1953 | Polacco | 210/232 X |
| 3,215,500 | 11/1965 | Bittner | 23/259 |
| 3,360,128 | 12/1967 | Federline | 210/232 X |
| 3,414,131 | 12/1968 | Allen, Jr. | 210/321 R |
| 3,459,176 | 8/1969 | Leonard | 210/321 A X |
| 3,485,751 | 12/1969 | Herrmann et al. | 210/22 |
| 3,733,179 | 5/1973 | Guehler | 23/259 X |
| 3,758,313 | 9/1973 | Scott | 210/22 X |

OTHER PUBLICATIONS

Ingram, Small-Scale Routine Dialysis Unit, 12/15/56, Chemistry & Industry, p. 1474.

*Primary Examiner*—Robert H. Spitzer
*Attorney, Agent, or Firm*—Browdy and Neimark

[57] ABSTRACT

A handling device for enabling a technician to dialyze a solution without direct contact with the solution to be dialyzed. The device comprises a polycarbonate rod having an internal bore and a test tube gripping element at one end. At the other end is clamped a section of dialysis tubing, there being a passageway from the test tube-gripping end through the internal bore and into the dialysis tubing. The dialysis tubing is knotted to form a dialysis bag. The rod is manipulated to grippingly engage over a test tube containing the solution to be dialyzed and the test tube is inverted to transfer its contents to the dialysis bag, after which the device is supported in inverted position with the bag in a dialysis bath. After dialysis, the device is removed and reversed, returning the dialyzed solution to the test tube.

10 Claims, 3 Drawing Figures

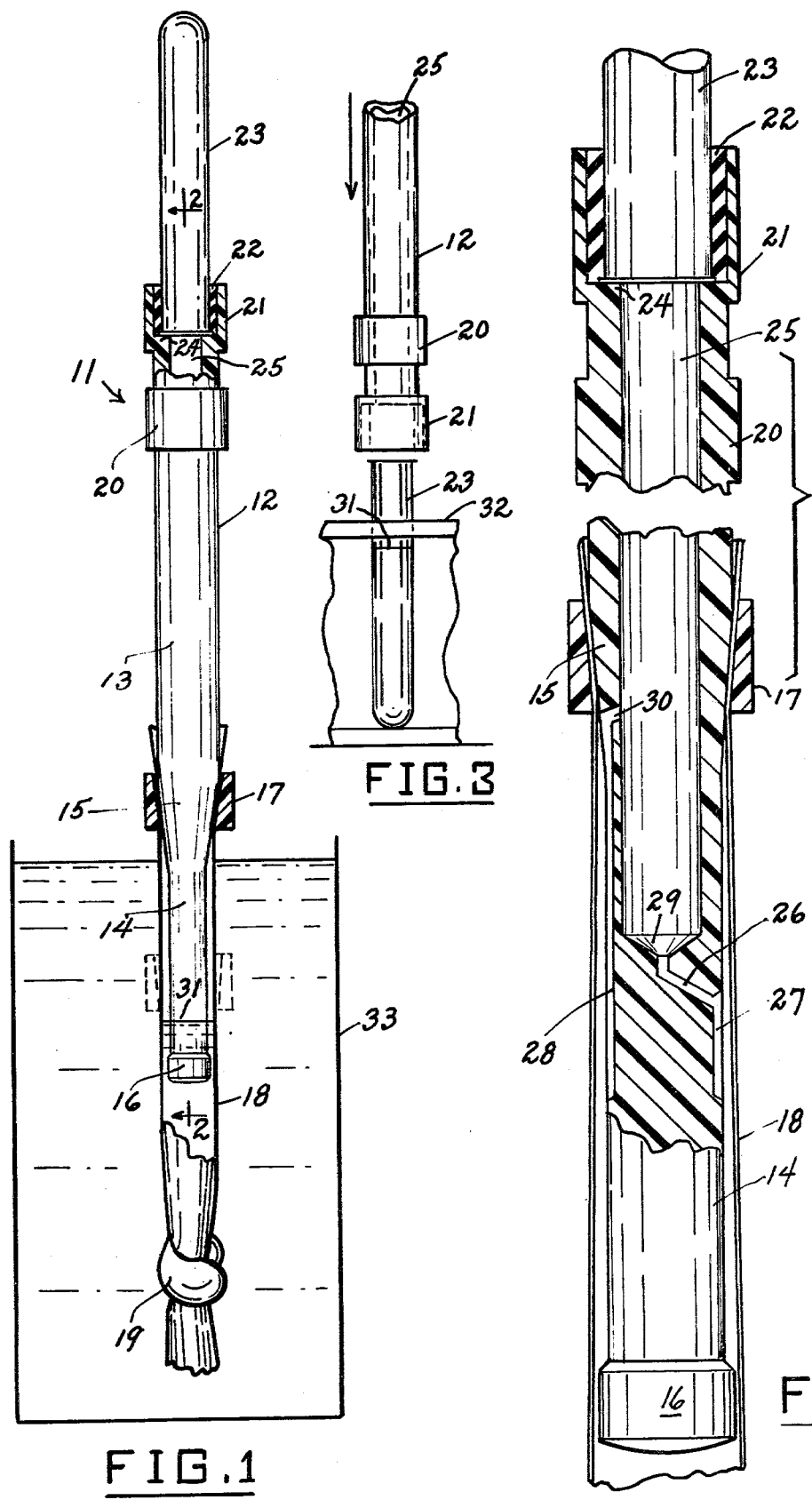

DIALYSIS SOLUTION HANDLING DEVICE

FIELD OF THE INVENTION

This invention relates to a handling device, and more particularly to a device for transferring a solution to be dialyzed from its normal container to a dialysis bag and for conveniently supporting the bag in a dialysis bath.

BACKGROUND OF THE INVENTION

Many materials, such as macromolecular solutions including radioactive materials, sterile solutions, infectious materials, and the like, require special handling precautions when being transferred, e.g., for dialysis. There is therefore a need for a simple and efficient means for safely and conveniently handling such materials during transfer, e.g., for achieving dialysis thereof, specifically, for transferring the solution to be dialyzed from its normal container, such as a test tube, to a dialyzer bag which can be supported in a dialysis bath, and for returning the solution after dialysis to its original container. In the prior art there is no simple and satisfactory device for meeting this general need, as for meeting the more specific handling need in the dialysis field.

SUMMARY OF THE INVENTION

Accordingly, an object of the present invention is to meet the needs of the art, as indicated above.

It is another object of the invention to provide for improved handling and transferring of dangerous to handle or easily contaminable liquids.

It is another object to reduce or eliminate contamination while handling or transferring liquids.

It is another object to provide an improved means for handling or transferring liquids.

Another object of the invention is to provide a novel and improved handling device for safely and easily transferring a solution to be dialyzed from a normal container to a dialyzing bag for dialysis and for subsequently returning the dialyzed solution to said normal container, the device enabling the solution to be thus handled in a sterile manner, without loss of the solution, and without risk of contamination, the device being sturdy in construction and being inexpensive to fabricate.

A further object of the invention is to provide an improved liquid sample-handling device which is simple in construction, which is safe to use, and which enables a solution to be efficiently transferred from a test tube or similar container to a dialyzing bag for exposure to a dialyzing bath, and for subsequently enabling the dialyzed solution to be quickly returned to its original container, the transfer and return being accomplished without loss of solution and without risk of contamination of the solution or hazard to the technician handling the solution.

A still further object of the invention is to provide an improved liquid handling device of the baton type for transferring a solution from a test tube to a dialyzing bag for exposure in a dialysis bath and for later returning the dialyzed solution to the test tube, the device being arranged to grippingly and sealingly engage the test tube at one end and to be received in and clamped to a section of dialysis tubing at its other end which can be knotted to form the dialysis bag, whereby the contents of the test tube can be transferred to the bag by merely inverting the device after it has engaged the test tube at said one end, said contents being returnable to the test tube after dialysis by returning the device to its original orientation.

A still further object of the invention is to provide an improved liquid-handling device of the baton type suitable for use where special care must be taken to prevent loss or contamination of or by liquids to be dialyzed, such as radioactive materials, sterile solutions, infectious materials, or other materials requiring special handling precautions, the device allowing the materials to be rapidly transferred from a test tube or similar container to a dialyzing bag and back again safely and without loss.

BRIEF DESCRIPTION OF THE DRAWINGS

Further objects and advantages of the invention will become apparent from the following detailed description of an embodiment, and from the accompanying drawings, wherein:

FIG. 1 is an elevational view, partly in vertical cross-section, of an improved dialysis liquid transfer device according to the present invention, shown in operating position, namely, in a position wherein liquid to be dialyzed has been transferred from a test tube to a dialyzing bag, with the bag shown immersed in a dialyzing bath.

FIG. 2 is an enlarged fragmentary vertical cross-sectional view taken substantially on the line 2—2 of FIG. 1.

FIG. 3 is a fragmentary elevational view showing a test tube containing a solution to be dialyzed, the test tube being in its original upright position in a supporting rack, and illustrating how the transfer device is positioned over the test tube, to be moved downwardly to grippingly and sealingly engage the top end of the test tube.

DESCRIPTION OF A PREFERRED EMBODIMENT

Referring to the drawings, 11 generally designates a typical dialysis solution handling device according to the present invention. The solution handling device 11 comprises a baton-shaped rod 12, preferably formed of a strong and inert plastic such as polycarbonate resin, having a generally cylindrical main upper portion 13 and a reduced diameter lower portion 14 integrally and unitarily connected by an intermediate tapered portion 15. The lower portion 14 has an enlarged bulb-like bottom end 16.

Designated at 17 is a sleeve-like locking ring engaged on the lower portion of the rod, as viewed in FIG. 1, having an internal taper which conforms with the intermediate tapered portion 15 and which is utilized to cooperate therewith to sealingly grip or pinch the upper portion of a section of dialysis tubing 18 therebetween, as shown in FIGS. 1 and 2. Tubing 18 comprises conventional semi-permeable dialysis tubing, such as Catalog No. 3787-D32, manufactured by Arthur H. Thomas Co., Philadelphia, Pa. The lower end portion of the tubing 18 is knotted, as shown at 19, to form a dialysis bag.

The upper end of the rod 12 has an enlarged integral gripping collar 20 to facilitate holding of the rod 12, the collar 20 being spaced a short distance below the enlarged cup-shaped top end 21 of the rod. A section of inert elastomeric tubing 22, preferably silicone rubber, is secured in the cup-shaped member 21, of sufficient wall thickness to allow the open end of a standard 15 mm O.D. glass test tube 23 to be pressed into the confined rubber tubing and to thereby cause the rubber tubing to sealingly grip the test tube, as illustrated in FIGS. 1 and 2, with the open end of the test tube substantially in abutment with an annular shoulder 24 defined by an axial bore or cavity 25 provided in the rod 12.

The gasket sleeve 22 may comprises silicone rubber tubing similar to Catalog No. 601–681, manufactured by Dow Corning Corp., Medical Products, Midland, Mich.

Referring to FIG. 2, it will be seen that the axial cavity 25 extends below the tapered rod portion 15 and communicates at its bottom end with a downwardly and laterally inclined passage 26, which in turn communicates with the top end of an outwardly facing longitudinal groove 27 formed in the reduced diameter rod portion 14. Such portion 14 is formed with another outwardly facing longitudinal groove 28 diametrically opposite the groove 27, rising a substantial height above the bottom 29 of cavity 25 and communicating at its top end with said cavity through a port 30, the top end of the groove 28 and the port 30 being located substantially at the level of the bottom edge of the clamping ring 17 when such ring 17 is in its clamping and sealing position, shown in FIG. 2.

The following sequential steps may be employed in the use of the baton-like handling device 11 above described:

(1) A suitable length of dialysis tubing 18 is placed in boiling distilled water to remove glycerine and other additives from the dialysis tubing.

(2) The wetted dialysis tubing is slipped over the bulb end 16 and over the larger end of tapered portion 15 of the rod 12.

(3) The locking ring 17 is then engaged over the tubing and is moved to its clamping position firmly securing the tubing 18 to tapered portion 15, as shown in FIG. 2. The lower end of the tubing is then securely knotted at 19, below the bulb end 16, forming a dialysis bag.

(4) The dialysis device thus formed is inverted and the cup-like end portion 21 is positioned facing vertically downwardly over the open top end of a test tube 23 containing the solution 31 to be dialyzed, the test tube being conventionally supported in a vertical position, for example, in a test tube rack 32, as shown in FIG. 3; the rod 12 is then lowered so that the test tube contacts the gasket sleeve 22 and is encompassed and gripped by the silicone rubber sleeve. The baton 12 may be lowered until the top end rim of the test tube is substantially in abutment with the annular shoulder 24.

(5) The device 11 is then turned upside-down, draining the solution 31 into cavity 25 and through the passages 29, 26 and groove 27 into the space between the dialysis bag and the rod. Air relief is provided by the groove 28 and passageway 30.

(6) The device is then placed above a dialysis bath 33 and is suitably supported with the dialysis bag immersed in the bath in the position shown in FIG. 1.

(7) When dialysis has been completed, the device 11 is removed from the dialysis bath and is turned upside-down, allowing the contents of the dialysis bag to drain back into test tube 23, complete return drainage being permitted by the provision of port 30 adjacent the clamped end of the bag.

When desired, the complete dialysis device 11 may be sterilized for reuse, either by ethylene oxide or by being placed in boiling distilled water for 10 minutes or more; at the time of use, sterile air (bottled or from a hypodermic syringe fitted with a sterile filter) may be used to inflate the dialysis bag.

From the above description it will be seen that the baton-like dialyzer device 11 minimizes manipulative procedures and avoids loss or contamination of its contents. It may be employed for any procedure in which dialysis tubing is used or for that matter in many other types of liquid transfer. Such procedures include dialysis and concentration of macromolecular solutions, neutralization, molecular weight separation, and ion exchange.

While a specific embodiment of an improved dialysis solution handling device has been illustratively disclosed in the foregoing description, it will be understood that various modifications within the spirit of the invention may occur to those skilled in the art. Therefore, it is intended that such modifications and adaptions may be made without departing from the invention.

What is claimed is:

1. A portable handling device comprising
a rod-like member having a reduced portion at one end and an enlarged bulb-like element at the lower end of said reduced portion, a removable liquid receiving member, means to sealingly secure said liquid receiving member to said rod-like member over said reduced portion to define a clearance space therebetween, and
conduit means including a cup-like element rigid with the other end of the rod-like member having releasable gripping and sealing means extending axially and of internal size the same as the external size of a standard sized test tube to supportingly and sealingly engage on its interior surface circumferentially and axially the upper end of a standard sized test tube,
said rod-like member being formed with passage means communicatively connecting the interior of said conduit means to said clearance space, whereby liquid from the test tube will drain to said clearance space and into said liquid receiving member when the rod member is inverted with the test tube upper end supportingly engaged by said test tube engaging means.

2. The liquid handling device of claim 1 and wherein said reduced portion has an upwardly flaring shape at its top end and wherein said securing means comprises a clamping ring member surrounding said reduced portion and internally substantially conforming with the upwardly flaring shape of the top end of the reduced portion.

3. The liquid handling device of claim 2, and wherein said shape is substantially frusto-conical.

4. A portable handling device comprising a rod-like member having a reduced portion at one end, a bag of flexible semi-permeable material for receiving liquid, means to sealingly secure said bag to said rod-like member over said reluced portion to define a clearance space therebetween, and conduit means rigid with the other end of the rod-like member having means to supportingly and sealingly engage the open end of a liquid container, said conduit means comprising a cup-like element at said other end of the rod-like member, said rod-like member being formed with passage means communicatively connecting the interior of said conduit means to said clearance space, whereby liquid from the container will drain to said clearance space and into said bag of flexible semi-permeable material when the rod member is inverted with the container open end supportingly engaged by said container-engaging means.

5. The liquid handling device of claim 4, and wherein said cup-like element is provided with an inner sealing and gripping lining of resilient deformable material.

6. The liquid handling device of claim 5, and wherein said passage means includes a longitudinally extending cavity formed in said rod-like member.

7. The liquid handling device of claim 6, and wherein said passage means includes means defining an outlet drainage passage communicatively connecting the bottom end of said cavity to said clearance space and means defining an inlet drainage passage communicatively connecting said clearance space to said cavity at a location adjacent the upper end of said clearance space.

8. The liquid handling device of claim 7, and wherein the means defining said outlet and inlet drainage passages includes respective outwardly facing longitudinal grooves formed in said reduced portion of the rod-like member.

9. A portable handling device comprising a rod-like member having a reduced portion at one end, a liquid receiving member comprising a length of flexible semi-permeable dialysis tubing provided with a sealing knot in its lower end portion, means to sealingly secure said liquid receiving member to said rod-like member over said reduced portion to define a clearance space therebetween, and conduit means rigid with the other end of the rod-like member having means to supportingly and sealingly engage the open end of a liquid container, said rod-like member being formed with passage means communicatively connecting the interior of said conduit means to said clearance space, whereby liquid from the container will drain to said clearance space and into said liquid receiving member when the rod member is inverted with the container open end supportingly engaged by said container-engaging means.

10. A portable handling device comprising a rod-like member having an internal liquid conducting bore passing through the interior thereof, said rod-like member having a liquid inlet end and a liquid outlet end, a removable liquid receiving member formed of flexible semi-permeable material located at said liquid exit end of said rod-like member, means to sealingly secure said liquid receiving member to said rod-like member over the liquid exit end of said rod-like member, and means to supportingly and sealingly engage the open end of a liquid container at the liquid inlet end of said rod-like member, whereby liquid from the container will drain through the interior of said rod-like member and out the exit end thereof into said liquid receiving member when the rod member is inverted with the container open end supportingly engaged by said container-engaging means.

* * * * *